(12) United States Patent
Owens

(10) Patent No.: US 7,322,253 B2
(45) Date of Patent: Jan. 29, 2008

(54) FISHING LINE TENSION MEASURING AND INDICATING SYSTEM

(76) Inventor: Henry Steven Owens, 434 Loma Alta Dr., Santa Barbara, CA (US) 93109

( * ) Notice: Subject to any disclaimer, the term of this patent is extended or adjusted under 35 U.S.C. 154(b) by 68 days.

(21) Appl. No.: 11/177,794

(22) Filed: Jul. 7, 2005

(65) Prior Publication Data

US 2007/0006667 A1    Jan. 11, 2007

(51) Int. Cl.
 *G01L 5/04*   (2006.01)
(52) U.S. Cl. ............... 73/862.391; 73/862.451; 73/862.474; 43/17
(58) Field of Classification Search ........... 73/862.391, 73/862.451, 862.474; 43/17
See application file for complete search history.

(56) References Cited

U.S. PATENT DOCUMENTS

| 4,418,489 A | * | 12/1983 | Mathauser .................. 43/17 |
| 4,693,125 A | * | 9/1987 | Krutz et al. ........... 73/862.391 |
| 5,259,252 A | * | 11/1993 | Kruse et al. ........... 73/862.391 |
| 6,591,222 B2 | * | 7/2003 | Stiner ...................... 702/173 |

* cited by examiner

*Primary Examiner*—Edward Lefkowitz
*Assistant Examiner*—Freddie Kirkland, III
(74) *Attorney, Agent, or Firm*—Donald D. Mon

(57) ABSTRACT

An attachment for a fishing rod to respond to tension on the fishing line. In one mode it responds to a lateral pull on the rod tip. In another mode it responds to an axial pull on the line. It enables accurate adjustment of the drag, and can indicate when the tension on the line is in a safe or risky range relative to the rated stress of the line.

5 Claims, 5 Drawing Sheets

FISHING LINE TENSION MEASURING AND INDICATING SYSTEM

FIELD OF THE INVENTION

A system and apparatus responsive to moment forces or to axial forces exerted on a fishing rod by an angler to measure and indicate the tension on a fishing line.

BACKGROUND OF THE INVENTION

Knowledge and control of fishing line tension is an important aspect of sophisticated rod and reel fishing. Line tension is typically controlled by an adjustable drag mechanism built into a reel, or applied directly to the line by finger force as is common in fly fishing. It is desirable to maintain the tension as high as possible without line breakage. Twenty five percent (25%) of rated breaking tension is a commonly selected tension setting.

An angler without an accurate and running measurement and indication of the existing line tension can only respond by "feel". He can apply manual pressure on the line or adjust the drag from the reel. In any event it is a guess.

What is worse, the actual drag varies almost continuously because of factors the angler cannot control. Among these is the temperature, the wetness of the reel, and the amount of line expended from the reel. A drag setting which was accurate a minute or two ago may be completely wrong under newly-generated conditions. As a result, good fish are often lost due to line breakage (too tight a setting), or too loose a setting.

It is an object of this invention to provide the angler with an accurate, real time indication of fishing line tension which information the angler can use to adjust the drag on the line to an appropriate value both while awaiting a strike, and throughout a continuing effort to land a fish.

It is an optional object of this invention to selectively provide such information depending on the direction of pull of the line at the tip of the rod, without regard to the physical parameters of the rod itself.

BRIEF DESCRIPTION OF THE INVENTION

The system of this invention functions in two modes. Each mode is related to the respective direction of pull of the line from the tip of the rod. In the first mode the rod is held so that its root alignment is approximately normal (90 degree) to the direction of the line as it extends away from the tip, the line being pulled by a fish or some other force. In the second mode the rod and root alignment are axially aligned with the line as it is pulled from the reel, the rod being pointed at the source of the pull.

There is a force responsive sensor for each mode. In the first mode the sensor is at a known distance from the root of course the distance from the root to the tip is also known. Then the moment (force multiplied by distance) exerted by the line will be countered by the moment exerted by the angler to oppose it. As a result the tension on the line can be calculated.

In the second mode the pull on the line is purely axial, and is countered by an axial pull on the device, which is also the pull on the rod. The line tension is therefore directly known.

According to a preferred but optional feature of the invention, in the first mode the sensor output will be a direct function of the line tension if the rod were a stiff pole. This is because the distance from the root to the tip would not be changed by an exerted lateral force because the rod would not, bend.

However, most rods do flex considerably, proportionally to the bending force. This does change the lever arm length to the tip (line distance), and therefore changes the moment derived from the product of the force and the length of the "arm". However, for most rods the bending caused by a lateral force is known and can therefore be compensated for in calculating a more precise measurement of line tension. This invention optionally provides means for calibrating the reading to account for the actual change in the shape of the rod.

In both modes the sensor itself does not rely on the properties of the rod. It measures only the force required to hold the rod in some predetermined orientation relative to the direction of pull on the line. Then this invention system reads out for the angler a close measurement of line tension.

The above and other features of this invention will be fully understood from the following detailed description and the accompanying drawings, in which:

DETAILED DESCRIPTION OF THE INVENTION

Figure 1:
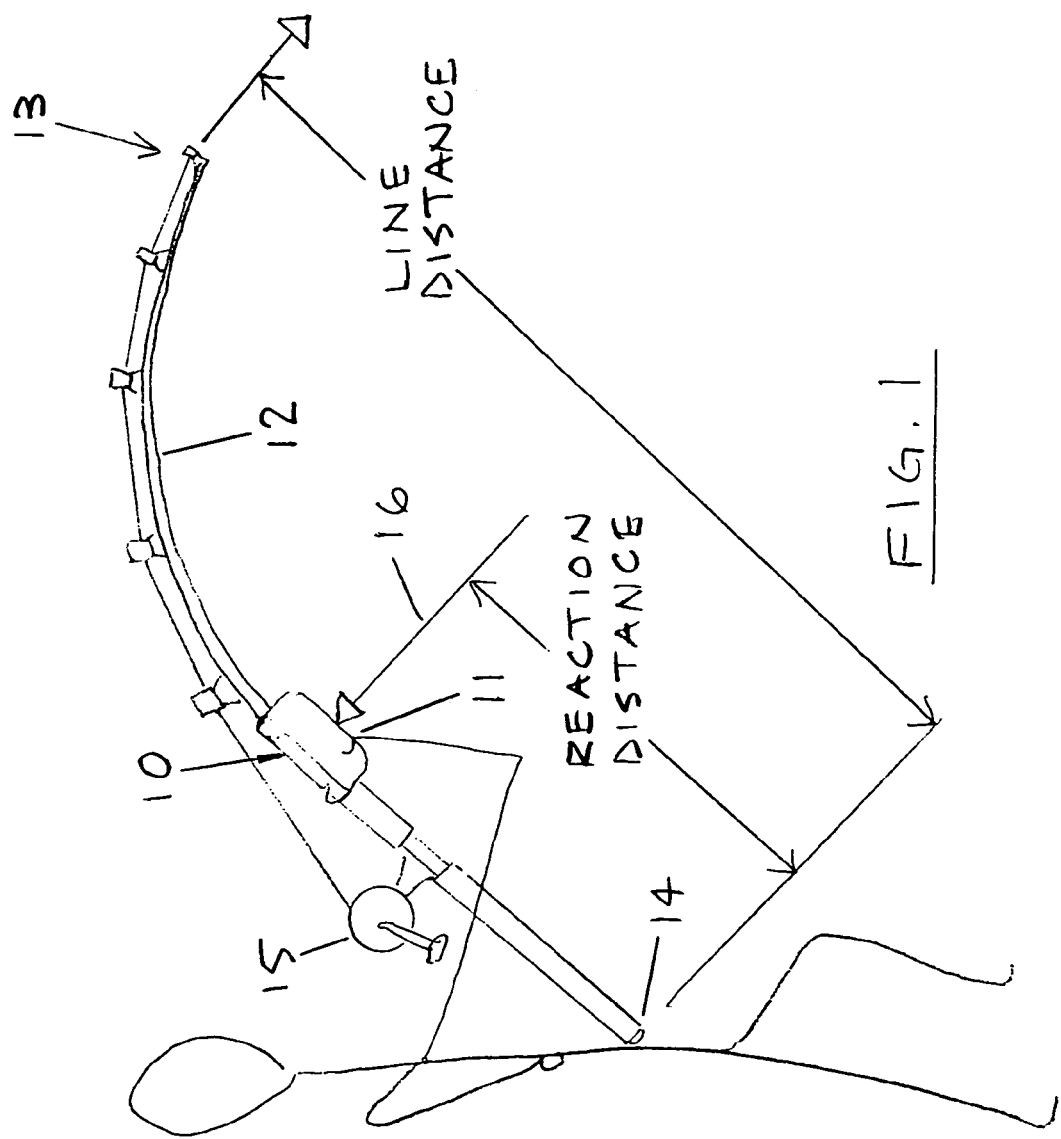
FIG. 1 is a schematic side elevation of the presently-preferred embodiment of the invention.

The scheme of the line tension measuring system 10 provided by the present invention is shown in FIG. 1 mounted to a fishing rod 12 in a location convenient to the angler's hand 11. In this Fig., use in a first mode is shown, with the angler resisting the moment produced by line force.

Line force exerted laterally on the rod by the fishing line at the tip 13 of the rod tends to pull the rod downwardly with line force 18, and the angler must pull up on the rod to counteract this force with a reaction force 16. The rod pivots about its root 14 so that the net moment of the forces exerted by the angler by his hand and the force exerted by the line at the tip multiplied by their respective distance from the root is zero.

The system in the first mode measures the force applied by the angler pulling up on the rod, and processes this data to the line tension. This signal is indicated to the angler in some signal form, which may be visual or audible.

Note that reel 15 is firmly attached to the rod, and the drag of this reel (or manual pressure by the angler when the angler exerts the drag), determines the tension, which is adjustable in both arrangements. The objective of the invention is to recognize and display the existing drag so the angler is aware of it, and can if necessary change it.

In the first mode, the sensing mechanism is essentially a force-measuring device located at the angler's hand which measures the lateral reaction force exerted at this place (arrow 16).

In the second mode, when the forces are axial, the rod will not be bent, because it is pointed in the direction of pull on the line. This might, for example, be toward a fish swimming away, or it might toward a person pulling on the line. In this mode the sensing mechanism is a force measuring device that measures the axial pull which the angler must exert on the rod to react to the pull of the line on the reel (arrow 17). This pulling on the reel pulls the rod away from the angler. His resistance to this pull is the source of the measured force in the second, axial, mode.

These modes are selectively used, one at a time at the choice of the angler. Apparatus for this purpose will now be described.

The apparatus is most usefully provided as a package adapted to be attached to the rod where the angler will exert the forces to be measured. It should be shaped as a convenient grip so as to be readily useful to the angler, and not be an impediment to this movement. In which ever mode is used, it is intended to provide current indication of the existing drag on the line, or if the line is not in use, what drag can be anticipated with the existing setting.

For this purpose the grip 20 is provided in three parts: an interface bar 21, an upper grip part 22 and a lower reaction grip part 23. These form a means to hold the grip to the rod, a housing, and a means for the angler to grasp the device and exert forces on the rod in the appropriate direction. It also houses the circuit components.

Grip 20 is held to the fore grip 25 (the base part) of the fishing rod. The rod 26 itself extends through the fore grip. The interface bar 21 is held to the rod by clamps 27. The grip parts 22 and 23 are placed between clamps 27 and together surround the rod with minor clearances which enable it to move axially and normally to the rod. Lower grip part 23 is keyed to the support bar to prevent unwanted rotation of the grip around the rod.

Figure 2:
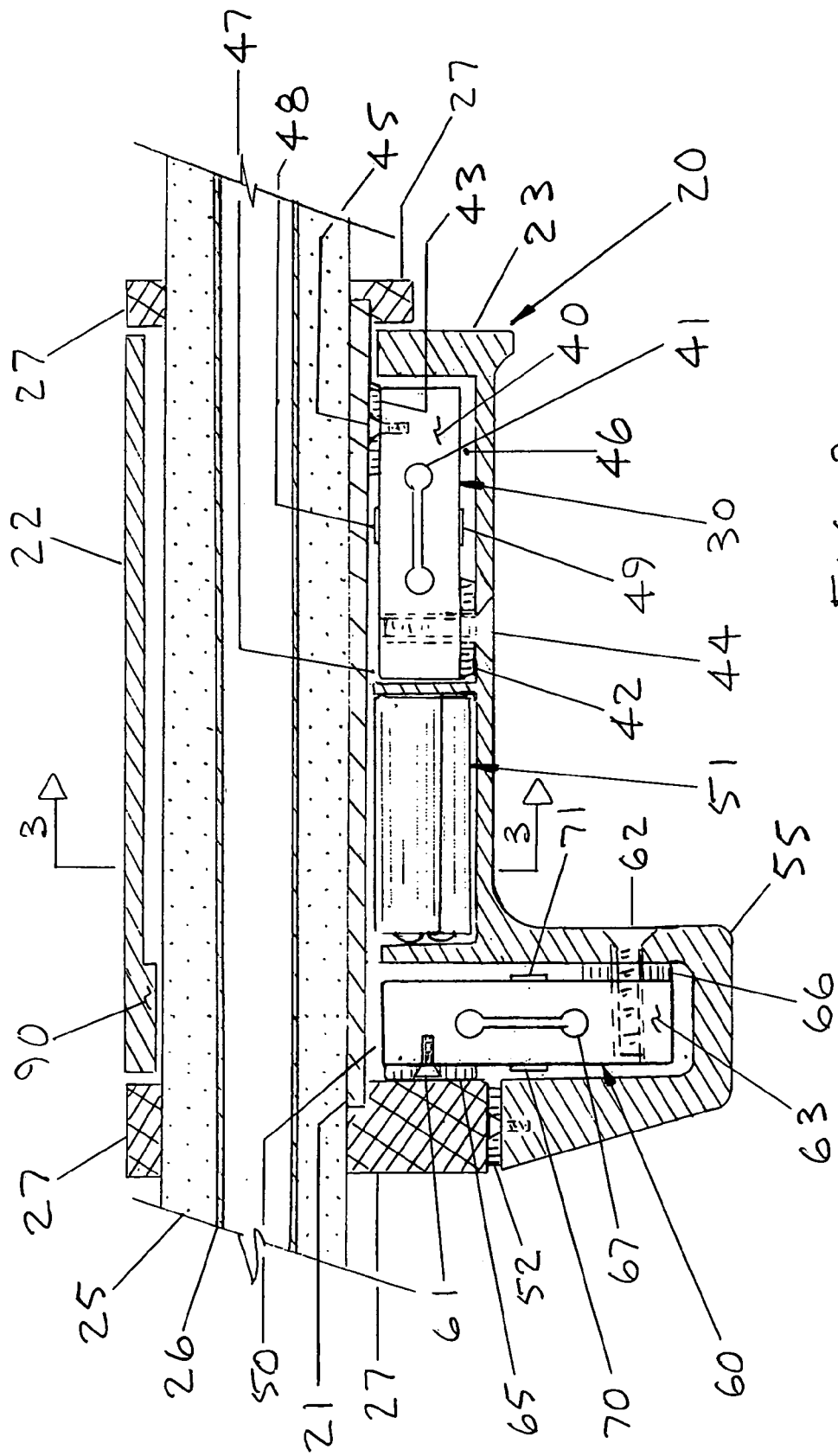
FIG. 2 is an axial cross-section of a grip portion of the invention.

Sensor 30 (FIG. 2) is intended to measure lateral forces on the grip. It is mounted by screw 44 to the lower grip 23. Sensor 30 experiences a cantilever load as follows: the angler lifts the grip 20 in a direction perpendicular to the fishing rod 26; the grip 20 compresses the spacer 42, spacer 42 compresses one end of the metal block 40; the other end of the metal block 40 compresses the spacer 43 spacer 43 compresses the interface bar 21. The interface bar transfers compressive load to the foregrip 25 and the rod 26, thus completing the load path. The grip is supported at the end away from sensors by spacer 52, to prevent unwanted rotation about the spacer 42.

Sensor 30 comprises a metal block 40 of known configuration with a central relief 41 that enables the block to flex stiffly in a predictable and repeatable manner as the result of lateral forces. Notice that spacers 42, 43 at screws 44 and 45 provide for clearances 46, 47 which enable the cantilever motion to occur.

To measure the forces, strain gauges 48, 49 are attached to opposite surfaces of block 40, such that when the lateral forces are exerted, one is in compression and the other is in tension. Circuitry connected to these strain gauges, usually in a Wheatstone bridge, provides for a direct measurement of the applied force.

The sensor 30 is housed in a cavity 50 of the grip. For convenience, batteries 51 can also be housed in it, along with such other circuitry 73 as is required.

The lower reaction grip part 23 is equipped and shaped to measure axial force in the second mode. Lower grip part 23 includes a shoulder 55 against which the angler's hand bears when he pulls against the line or supports the line against any axial force.

A second sensor 60 (for the second, axial mode) is mounted by screw 62 to lower grip part 23. This sensor is a block 63 (similar to block 40) mounted to mounts 65, 66 to enable the block to flex, the block having an internal relief 67.

Strain gages 70, 71 are fixed to block 60. Suitable circuitry will be connected to them for measurement purposes. When an axial force is exerted on shoulder 55 in opposition to an axial pull on the rod, one of the strain gages will be placed in tension and the other in compression.

Notice that the sensors 30 and 60 are separate and discrete and disposed so as to be responsive to forces exerted at right angles to one another. In this example the system is configured such that the sensors 30 and 60 operate independently, and such that each sensor experiences only cantilever loads. Each sensor is fixed to the lower grip 23, but it only abuts the inner structure, interface bar 21 and end clamps 27.

The spacer 43 is fixed to the sensor 30 with screw 45 but interacts slidingly with interface bar 21. The spacer 52 is interposed between lower grip 23 and clamp 27. It interacts slidingly with the face of clamp 27. In this way the grip 23 may travel a sufficient axial direction to transfer "axial measuring" cantilever load to sensor 60, but transfers no load to sensor 30.

Similarly, spacer 65 is fixed to the sensor 60 with screw 61, but interacts slidingly with the face of clamp 27. In this way the grip 23 may travel a sufficient lateral direction to transfer "moment measuring" cantilever load to sensor 30, but transfers no load to sensor 60.

The foregoing describes the theory of this invention, and the simple sensor means which produce useful information. The sensors described above, are common, commercially available, load sensors. Load sensors come in a wide array of styles and types, and any type of sufficiently-accurate load sensor could suffice for this application. While two separate and individual sensors (or sets of sensors) have been shown, there exist other types of sensors which are responsive to orthogonally related forces in a single structure. Such a single sensor would fulfill the role of the two sensors described here. These packaging options are intended to be within the scope of the invention. The objective is to measure a sideward force at a known location, and an axial force anywhere on the rod, to produce data that can readily be read or processed for a respective mode.

Figure 5:
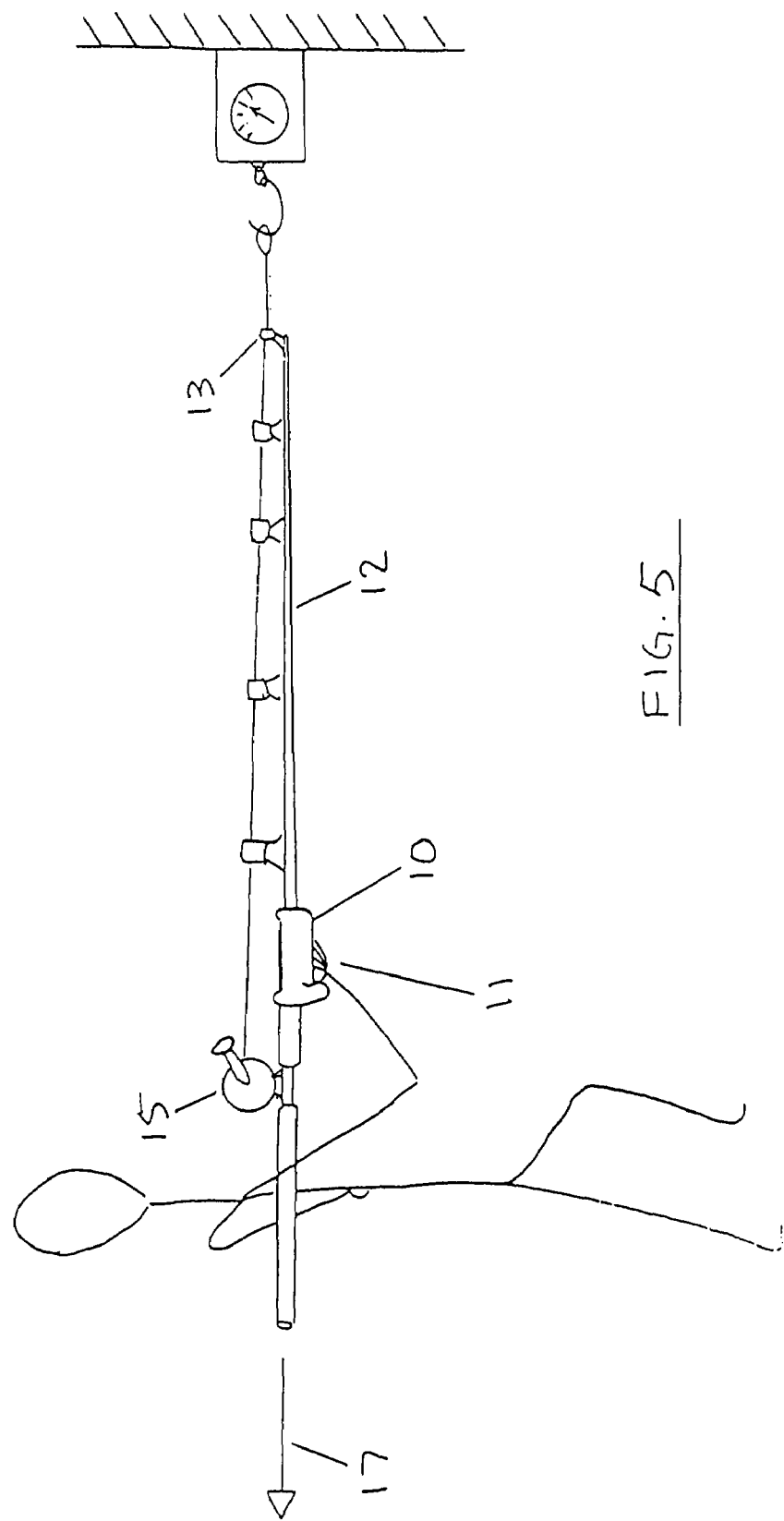
FIG. 5 is a schematic side elevation of the invention utilized in one of its modes.

As an examination of FIG. 5 will show, the use of the system in the second, axial, mode is straightforward. Merely measure the axial force, convert the sensor output to a useful reading and display it. When adjusting the tension, a known force (such as a weight suspended from a cable looped over a pulley), or pulling against a spring screw can calibrate the system. There is no concern about the flexibility of the rod in this mode.

If the flexure of the rod, which would tend to shorten the line distance in FIG. 1 is ignored, a relatively simple circuit can be used. Essentially this would treat the rod as a stiff member. While this may be acceptable for some very heavy duty rods, it is notably insufficient for many rods.

For such more-sophisticated uses, calibration techniques are called for. Rods provided by recognized manufacturers are reasonably consistent in their bending properties. A given lateral pull will result in a known lateral displacement of the rod tip. It is not a straight line function, and it is not an identical "number" for differently rated rods within the manufacturer's line of rods, or between rods of different manufacturers.

Accordingly, calibration means are desirable if more accurate measurements and indications are sought. Still it should be remembered that it is a different situation when one is calibrating or setting a drag in the shop, or on the boat while not fighting a fish, and adjusting the drag while fighting a fish.

While numerical displays are useful at all times they are mostly useful in quiet times.

At more active times, for example when catching a fish, the angler is not interested in reading a number as in a meter.

He is too busy. What he needs is to know, for a line of selected strength, whether the forces then being exerted are within a safe range, a caution range, or a danger range.

Figure 3:
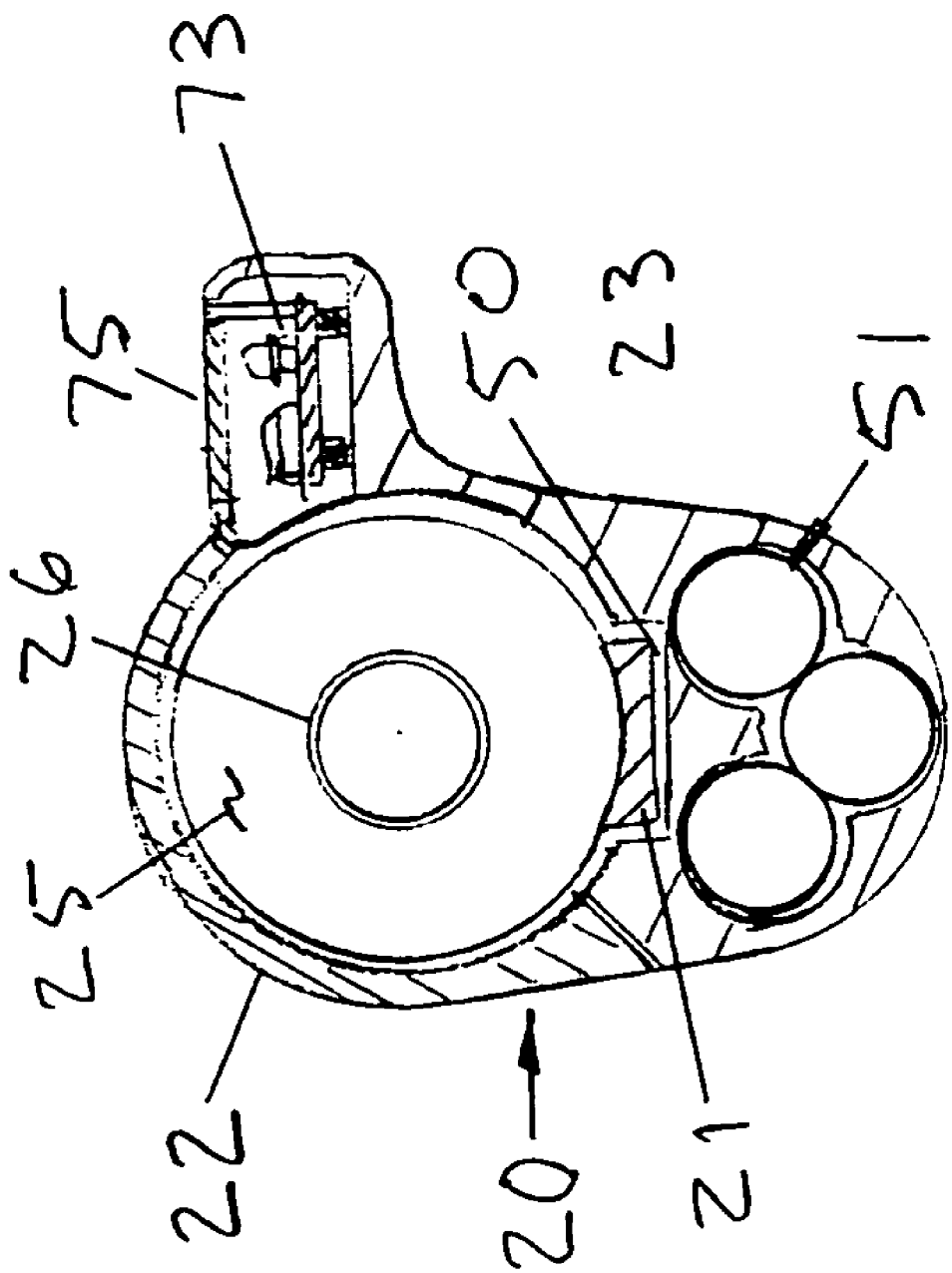
FIG. 3 is a cross-section taken at line 3-3 in FIG. 2.

These ranges can be displayed on a running basis, for example by a light (green, orange, red), or by an audible alarm (intermittent, repetitive, continuous). FIG. 3 shows a shoulder on the lower grip part carrying display means 75 visible to, or audible by, the angler.

Figure 4:
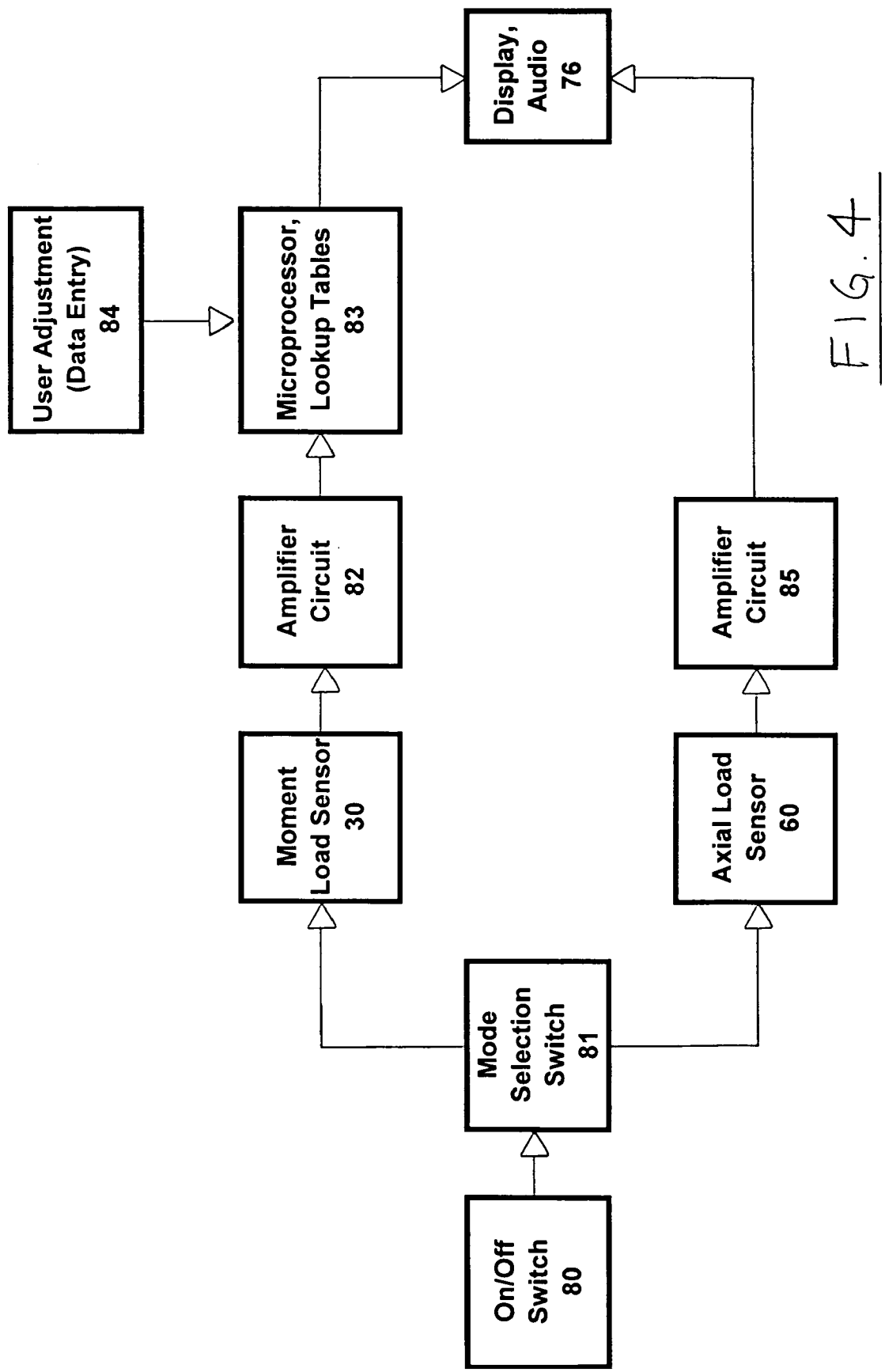
FIG. 4 is a schematic drawing of circuitry useful in this invention.

A schematic presentation of system 10 is given in FIG. 4. An on-off switch 80 to power or to disconnect the circuitry is connected to both a source of power (for example batteries 51), and to a mode selection switch 81 (sometimes referred to as a "selector means"). Switch 81 will be used when the system provides both modes.

Simpler systems may involve only one or the other of the two modes. In such event these will not be two branches of the circuitry at this point. Only one of them will be provided.

In the illustrated example, the first mode branch includes load sensors 30, whose response is amplified by amplifier circuit 82. When calibration or adjustment to respond to the bending of the rod is unnecessary a simple reference respective to that rod will be sufficient.

In the more frequent event, the output from amplifier circuit 82 will be provided to calibration means 83, which, for example will usually include "look-up" tables to be described below. Sometimes a user (angler) 84 will select the calibration means, whose output will then be supplied as a command to display 76.

The presentation of FIG. 4 will be sufficient for a skilled person to provide effective circuitry. There are many alternatives. A reasonably priced and very sufficient system will incorporate a microprocessor into which may be loaded various strategies.

For example, if the line is expected to break at 100 pounds of line force, and an acceptable and always safe drag force is 25 pounds, then the system may be set up so as to sound a red alarm at above 35 pounds, a green display between about 23 and 27 pounds, and a caution display between about 28 and 35 pounds.

These ranges can be established in look-up tables respective to rods of known length and stiffness, and can be selected by the user to conform to the rod he is using. Micro processors are capable of storing a large number of such tables.

The system is appropriately powered by the batteries. In operation it is selected for mode (when selection is available), and operated merely by manipulating the rod appropriately. The drag can be adjusted on a running basis by adjusting the drag linkage on the reel. This attends to the "line" use of the system.

In the shop, home or on the dock, the drag can be set by adjusting the mechanism while resisting a known force. Such a 14 use is shown in FIG. 5, in which a rod 12 is pulled against a resistive force exerted by a scale mounted to a wall or other base. This illustrates the second mode in use in the home or shop. The rod is directed toward the source of force. During active fishing, the rod will be pointed toward the fish.

It may be seen that the device, operating in the first (moment) mode, will operate effectively for the case where the angler holds the rod with one hand only, and does not rest the butt end of the rod against his torso, as is often the case with fly fishing, trout fishing, and bass fishing. In this case, the distance for the reacting moment arm is simply the distance from abutment 90 to the load sensor 30, shown in FIG. 2. The distance would be loaded into the device upon initial programming. This enables the force reading from sensor 30 to be meaningful as a measurement of the moment to be resisted. The distance from the grip to the butt end is of no interest in this use, because there is no reaction at the butt end. Instead, the moment at the grip is the product of the dimensions of the grip and the exerted force. Thus, the force can be a measure of the line tension.

This system responds classically to the forces it is exposed to, and provides to the angler a means to assure himself that the instant drag setting is appropriate, and that during fishing action it can be adjusted to safe and effective values.

This invention is not be to limited by the embodiments shown in the drawings and described in the description, which are given by way of example and not of limitation, but only in accordance with the scope of the appended claims.

I claim:

1. Apparatus for measuring and indicating the tension on a fishing line, said line being played out from a reel mounted to a rod, said rod having a butt end, a tip end, and a central linear axis in its unstressed condition, said reel being mounted to said rod between said ends, said line passing from the reel out from said tip at an angle determined by a pull on the line relative to the said axis of the rod near the tip end, said apparatus being mounted between said ends at a known reaction distance from the butt end when the rod is in said unstressed condition, said apparatus comprising:
    a mount attached to said rod between said ends, at a known reaction distance from said butt end;
    a grip carried by said mount adapted to be grasped by an angler while the butt end is located at a fixed location such as a socket or place of the angler's body, said grip being responsive to a lateral force exerted by the angler, and to an axial force exerted by the angler;
    a first sensor engaged by said grip responsive to a lateral force on said grip to create a moment relating to its reaction distance from the butt end to counter a line force that creates a moment relating to line force and the line distance whereby the force exerted on said first sensor when the sum of the moments is zero is a measurement of the line force when the line is pulled normally to the said axis;
    a second sensor engaged by said grip responsive to the force of an axial pull on the rod exerted on the reel with the line aligned with said axis and the rod laterally unstressed, whereby said force of said axial pull is substantially equal to the line tension;
    means responsive to a respective sensor to provide a signal indicative of the line tension; and
    selector means to selectively choose which of said two sensors shall at a selected time be utilized.

2. Apparatus according to claim 1 in which said reel includes adjustable drag means, whereby the drag exerted by the reel can be associated with an exerted line force.

3. Apparatus according to claim 1 in which said responsive means provide a visual or audible signal indication of an exerted line force.

4. Apparatus according to claim 1 in which said responsive means includes calibration means responsive to the reduction of line distance by bending of the rod caused by line forced exerted normally to the linear axis.

5. Apparatus according to claim 1 in which the reel includes a drag means, said signal being useful as instructions for adjusting the drag on said reel.

* * * * *